(12) United States Patent
Xu et al.

(10) Patent No.: US 10,652,205 B2
(45) Date of Patent: May 12, 2020

(54) NAT ENTRY MANAGEMENT METHOD AND NAT DEVICE

(71) Applicant: HUAWEI TECHNOLOGIES CO., LTD., Shenzhen (CN)

(72) Inventors: Yibin Xu, Nanjing (CN); Donghui Wang, Nanjing (CN); Rong Yang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/145,099

(22) Filed: Sep. 27, 2018

(65) Prior Publication Data

US 2019/0097967 A1    Mar. 28, 2019

(30) Foreign Application Priority Data

Sep. 27, 2017   (CN) .......................... 2017 1 0896356

(51) Int. Cl.
G06F 15/16    (2006.01)
H04L 29/12    (2006.01)
H04L 12/741   (2013.01)

(52) U.S. Cl.
CPC ............ H04L 61/256 (2013.01); H04L 45/74 (2013.01); H04L 61/2053 (2013.01);
(Continued)

(58) Field of Classification Search
CPC ..... H04L 61/2514; H04L 63/20; H04L 45/74; H04L 12/4641; H04L 61/256;
(Continued)

(56) References Cited

U.S. PATENT DOCUMENTS 7,127,524 B1 * 10/2006 Renda ..................... H04L 29/12
                                                    709/245
10,129,207 B1 * 11/2018 Wan ........................ H04L 45/74
(Continued)

FOREIGN PATENT DOCUMENTS

CN    101753637 A    6/2010
CN    103944760 A    7/2014
(Continued)

OTHER PUBLICATIONS

Rosenberg J et al, STUN-Simple Traversal of User Datagram Protocol (UDP) Through Network Address Translators(NATs);rfc3489 .txt, Mar. 1, 2003, XP015009272, 47 pages.
(Continued)

*Primary Examiner* — Michael A Keller
*Assistant Examiner* — Thao D Duong
(74) *Attorney, Agent, or Firm* — Kilpatrick Townsend & Stockton LLP

(57) ABSTRACT

A NAT entry management method and a NAT device are disclosed. The method includes: receiving and storing, by a NAT device, a connection parameter, where the connection parameter includes an address of a controller; receiving a packet sent by a network device, where a source address of the packet is a private address of the network device and a destination address of the packet is the address of the controller; performing NAT on the packet, where an after-NAT source address of the packet is a public address; and when a static entry condition is met, generating a target static NAT entry, where the static entry condition includes that the destination address of the packet is the address of the controller. This can prevent aging of the NAT entry from affecting communication between the network device and the controller.

9 Claims, 2 Drawing Sheets

(52) U.S. Cl.
CPC ........ *H04L 61/255* (2013.01); *H04L 61/2514* (2013.01); *H04L 61/2517* (2013.01); *H04L 61/2557* (2013.01)

(58) Field of Classification Search
CPC . H04L 12/4633; H04L 63/0272; H04L 67/10; H04L 43/08
See application file for complete search history.

(56) References Cited

U.S. PATENT DOCUMENTS

| | | |
|---|---|---|
| 2004/0139230 A1 | 7/2004 | Kim |
| 2004/0252683 A1* | 12/2004 | Kennedy ................ H04L 29/06 370/389 |
| 2006/0212554 A1* | 9/2006 | Shouno ............ H04L 29/12528 709/221 |
| 2007/0189190 A1 | 8/2007 | Feng et al. |
| 2011/0188491 A1 | 8/2011 | Boulanov et al. |
| 2013/0279519 A1 | 10/2013 | Lu et al. |
| 2014/0245421 A1 | 8/2014 | Lyon |

FOREIGN PATENT DOCUMENTS

| | | |
|---|---|---|
| CN | 104135548 A | 11/2014 |
| CN | 105100299 A | 11/2015 |

OTHER PUBLICATIONS

Fabio Semperboni, Using route maps for conditional NAT/ CiscoZine, Feb. 20, 2013, XP055540133, 5 pages.

* cited by examiner

NAT ENTRY MANAGEMENT METHOD AND NAT DEVICE

CROSS-REFERENCE TO RELATED APPLICATION

This application claims priority to Chinese Patent Application No. 201710896356.1, filed on Sep. 27, 2017, which is hereby incorporated by reference in its entirety.

TECHNICAL FIELD

This application relates to the field of communications technologies, and in particular, to a NAT entry management method and apparatus, and a NAT device.

BACKGROUND

Network address translation (NAT) is used to enable a private network (using private Internet Protocol (IP) addresses) device to access a public network (using public IP addresses) device.

When translating a private IP address into a public IP address, a NAT device establishes a NAT entry in a NAT table to record a translation relationship between the private IP address and the public IP address. Based on a translation relationship recorded in a NAT entry, NAT is performed on a packet that hits the NAT entry. When duration in which a NAT entry fails to be hit exceeds an aging time, the NAT entry is deleted.

In some scenarios, a controller remotely controls a network device, such as a router or a switch. The network device is usually located in a private network, and the controller is usually located in a public network. Therefore, when the network device accesses the controller, address translation needs to be performed on a packet sent by the network device before the packet is transmitted to the controller. A persistent connection that remains connected for a long time is established between the network device and the controller. After the persistent connection is established, there is often no communication between the network device and the controller over a long time. As a result, a NAT entry that is in the NAT device and corresponding to the network device and the controller fails to be hit for a long time and consequently is deleted due to aging. In this case, when the network device sends a packet to the controller again, the NAT device cannot perform NAT on the packet based on the translation relationship in the original NAT entry. As a result, the network device and the controller cannot normally communicate with each other.

SUMMARY

This application provides a NAT entry management method and apparatus, and a NAT device, so as to prevent aging of a NAT entry from affecting communication between a network device and a controller.

According to a first aspect, this application provides a NAT entry management method, including: receiving and storing, by a NAT device, a connection parameter, where the connection parameter includes an address of a controller; receiving, by the NAT device, a packet sent by a network device, where a source address of the packet is a private address of the network device and a destination address of the packet is the address of the controller; performing, by the NAT device, NAT on the packet, where an after-NAT source address of the packet is a public address; and on a basis that a static entry condition is met, generating, by the NAT device, a target static NAT entry, where the target static NAT entry includes a correspondence between the private address of the network device, a before-NAT source port number of the packet, an after-NAT source port number of the packet, and the address of the controller, and the static entry condition includes that the destination address of the packet is the address of the controller.

In this application, the NAT device generates the static NAT entry for the packet whose destination address is the address of the controller. In this way, a NAT entry corresponding to a persistent connection established between the network device and the controller is the static NAT entry. Even if duration in which the static NAT entry fails to be hit exceeds an aging time, the static NAT entry is not deleted. This avoids a problem that the network device and the controller cannot normally communicate with each other because the NAT entry is deleted due to long-time no communication between the network device and the controller.

With reference to the first aspect, in a first possible implementation of the first aspect, the connection parameter further includes a port number set, and the port number set includes one or more port numbers of the controller that are open to the network device; the static entry condition further includes that a destination port number of the packet belongs to the port number set; and the target static NAT entry further includes a correspondence between the private address of the network device, the before-NAT source port number of the packet, the after-NAT source port number of the packet, the address of the controller, and the destination port number of the packet.

With reference to the first aspect or the foregoing possible implementation, in a second possible implementation of the first aspect, the connection parameter further includes a transport layer protocol type for establishing a connection between the controller and the network device; the static entry condition further includes that a transport layer protocol type of a connection establishment packet is the transport layer protocol type in the connection parameter; and the target static NAT entry further includes a correspondence between the private address of the network device, the before-NAT source port number of the packet, the after-NAT source port number of the packet, the address of the controller, and the transport layer protocol type.

With reference to the first aspect or the foregoing possible implementations, in a third possible implementation of the first aspect, the method further includes:

receiving, by the NAT device, a first deletion instruction sent by the controller, where the first deletion instruction includes the connection parameter; and deleting, by the NAT device, the connection parameter and all static NAT entries corresponding to the connection parameter.

When the controller restarts, the controller sends the first deletion instruction to instruct the NAT device to delete static NAT entries corresponding to all persistent connections of the controller. The NAT device deletes, based on the first connection parameter, the stored connection parameter and all static NAT entries corresponding to the connection parameter, to be specific, the static NAT entries corresponding to all persistent connections of the controller. This reduces a quantity of NAT entries stored in the NAT device and relieves workload in maintaining and managing the NAT entries.

With reference to the first aspect or the foregoing possible implementations, in a fourth possible implementation of the first aspect, the method further includes:

receiving, by the NAT device, a second deletion instruction sent by the controller, where the second deletion instruction includes the connection parameter and a target parameter, and the target parameter includes the public address of the network device, or the target parameter includes the public address of the network device and the after-NAT source port number; and deleting, by the NAT device, the connection parameter and a target static NAT entry corresponding to the connection parameter and the target parameter.

When all previous connections between the controller and a particular network device are disconnected, the controller sends a second deletion instruction with a target parameter that includes a public address of the network device, so as to instruct the NAT device to delete static NAT entries corresponding to all persistent connections between the controller and the particular network device. When a previous particular connection between the controller and a particular network device is disconnected, the controller sends a second deletion instruction with a target parameter that includes a public address of the network device and an after-NAT source port number, so as to instruct the NAT device to delete a static NAT entry corresponding to a particular persistent connection between the controller and the particular network device. The NAT device deletes, based on the second connection parameter, the stored connection parameter and the target static NAT entry corresponding to the connection parameter and the target parameter. This reduces a quantity of NAT entries stored in the NAT device and relieves workload in maintaining and managing the NAT entries.

According to a second aspect, this application provides a NAT entry management apparatus, including a receiving unit, configured to receive and store a connection parameter, where the connection parameter includes an address of a controller; where the receiving unit is further configured to receive a packet sent by a network device, where a source address of the packet is a private address of the network device and a destination address of the packet is the address of the controller; a translation unit, configured to perform NAT on the packet, where an after-NAT source address of the packet is a public address; and a generation unit, configured to generate a target static NAT entry on a basis that a static entry condition is met, where the target static NAT entry includes a correspondence between the private address of the network device, a before-NAT source port number of the packet, an after-NAT source port number of the packet, and the address of the controller, and the static entry condition includes that the destination address of the packet is the address of the controller.

With reference to the second aspect, in a first possible implementation of the second aspect, the connection parameter further includes a port number set, and the port number set includes one or more port numbers of the controller that are open to the network device; the static entry condition further includes that a destination port number of the packet belongs to the port number set; and the target static NAT entry further includes a correspondence between the private address of the network device, the before-NAT source port number of the packet, the after-NAT source port number of the packet, the address of the controller, and the destination port number of the packet.

With reference to the second aspect or the foregoing possible implementation, in a second possible implementation of the second aspect, the connection parameter further includes a transport layer protocol type for establishing a connection between the controller and the network device; the static entry condition further includes that a transport layer protocol type of a connection establishment packet is the transport layer protocol type in the connection parameter; and the target static NAT entry further includes a correspondence between the private address, the private port number, the public port number that are of the network device, the address of the controller, and the transport layer protocol type.

With reference to the second aspect or the foregoing possible implementations, in a third possible implementation of the second aspect, the receiving unit is further configured to receive a first deletion instruction sent by the controller, where the first deletion instruction includes the connection parameter; and the apparatus further includes: a first deletion unit, configured to delete the connection parameter and all static NAT entries corresponding to the connection parameter.

With reference to the second aspect or the foregoing possible implementations, in a fourth possible implementation of the second aspect, the receiving unit is further configured to receive a second deletion instruction sent by the controller, where the second deletion instruction includes the connection parameter and a target parameter, and the target parameter includes the public address of the network device, or the target parameter includes the public address of the network device and the after-NAT source port number; and the apparatus further includes: a second deletion unit, configured to delete the connection parameter and a target static NAT entry corresponding to the connection parameter and the target parameter.

According to a third aspect, an embodiment of the present invention provides a NAT device, including a memory, a processor, and a communications interface, where the processor is configured to: receive a connection parameter by using the communications interface and store the connection parameter in the memory, where the connection parameter includes an address of a controller; receive, by using the communications interface, a packet sent by a network device, where a source address of the packet is a private address of the network device and a destination address of the packet is the address of the controller; perform NAT on the packet, where an after-NAT source address of the packet is a public address; and generate a target static NAT entry on a basis that a static entry condition is met, where the target static NAT entry includes a correspondence between the private address of the network device, a before-NAT source port number of the packet, an after-NAT source port number of the packet, and the address of the controller, and the static entry condition includes that the destination address of the packet is the address of the controller.

With reference to the third aspect, in a first possible implementation of the third aspect, the connection parameter further includes a port number set, and the port number set includes one or more port numbers of the controller that are open to the network device; the static entry condition further includes that a destination port number of the packet belongs to the port number set; and the target static NAT entry further includes a correspondence between the private address of the network device, the before-NAT source port number of the packet, the after-NAT source port number of the packet, the address of the controller, and the destination port number of the packet.

With reference to the third aspect or the foregoing possible implementation, in a second possible implementation of the third aspect, the connection parameter further includes a transport layer protocol type for establishing a connection between the controller and the network device; the static entry condition further includes that a transport layer protocol type of a connection establishment packet is the transport layer protocol type in the connection parameter; and the target static NAT entry further includes a correspondence between the private address of the network device, the before-NAT source port number of the packet, the after-NAT source port number of the packet, the address of the controller, and the transport layer protocol type.

With reference to the third aspect or the foregoing possible implementations, in a third possible implementation of the third aspect, the processor is further configured to: receive, by using the communications interface, a first deletion instruction sent by the controller, where the first deletion instruction includes the connection parameter; and delete the connection parameter and all static NAT entries corresponding to the connection parameter.

With reference to the third aspect or the foregoing possible implementations, in a fourth possible implementation of the third aspect, the processor is further configured to: receive, by using the communications interface, a second deletion instruction sent by the controller, where the second deletion instruction includes the connection parameter and a target parameter, and the target parameter includes the public address of the network device, or the target parameter includes the public address of the network device and the after-NAT source port number; and delete the connection parameter and a target static NAT entry corresponding to the connection parameter and the target parameter.

According to a fourth aspect, an embodiment of the present invention provides a computer-readable storage medium, where the computer-readable storage medium stores an instruction, and when the instruction runs on a computer, the computer is enabled to execute the method according to the first aspect.

BRIEF DESCRIPTION OF DRAWINGS

To describe the technical solutions in the embodiments of the present invention more clearly, the following briefly describes the accompanying drawings required for describing the embodiments.

DESCRIPTION OF EMBODIMENTS

Figure 1:
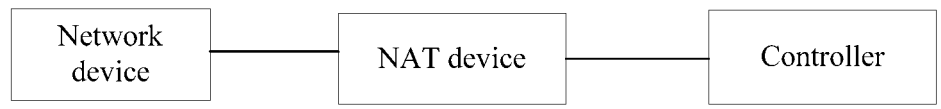
FIG. 1 is a schematic diagram of a network architecture according to an embodiment of the present invention.

Embodiments of the present invention are applicable to management of a NAT entry by a NAT device. FIG. 1 is a schematic diagram of a network architecture according to an embodiment of the present invention. As shown in FIG. 1, a network device is located in a private network, and a controller is located in a public network. The controller and the network device communicate with each other by using an established persistent connection. When a NAT device is used for communication between the network device and the controller, the NAT device performs NAT on a packet transmitted between the network device and the controller. The NAT device may be connected to the controller by using a wide area network, and the network device may be specifically a router, a switch, or the like.

Figure 2:
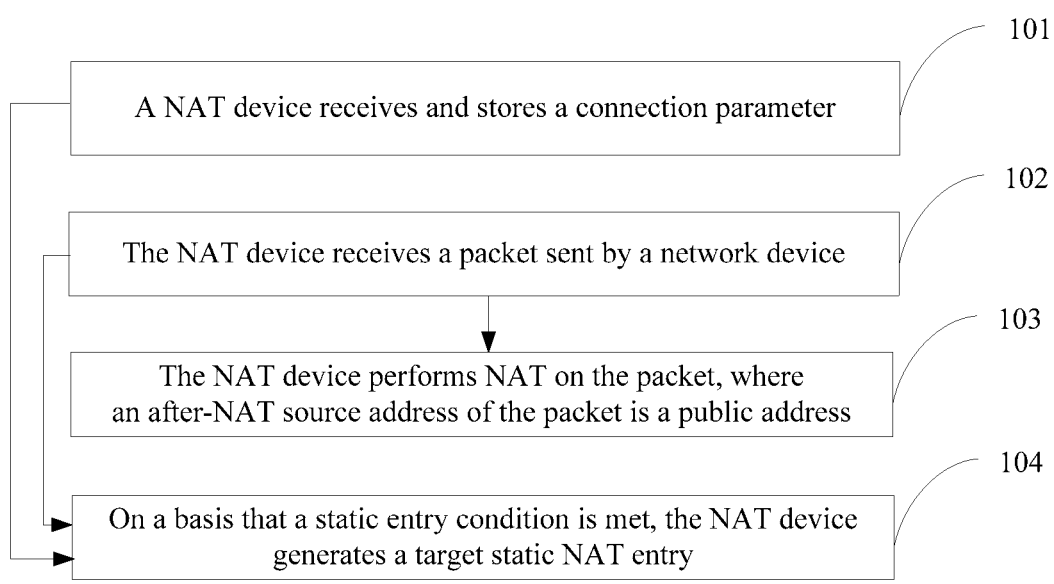
FIG. 2 is a schematic block flowchart of a NAT entry management method according to an embodiment of the present invention.

An embodiment of the present invention provides a NAT entry management method applied to a NAT device, and specifically to a NAT device in the network architecture shown in FIG. 1. As shown in FIG. 2, the method includes the following steps.

101: The NAT device receives and stores a connection parameter.

The connection parameter includes an address of a controller, such as an IP address. The connection parameter may be sent by the controller to the NAT device, or may be sent by another management device or a server to the NAT device.

The connection parameter may further include a port number set, and the port number set includes one or more port numbers of the controller that are open to a network device. One or more port numbers open to network devices may be preset in the controller and these port numbers open to the network devices are used for establishing connections between the controller and the network devices. The port number is a transport layer protocol port number, for example, a Transmission Control Protocol (TCP) port number or a User Datagram Protocol (UDP) port number.

The connection parameter may further include a transport layer protocol type for establishing a connection between the controller and the network device. For example, the connection parameter indicates that the transport layer protocol type is TCP or that the transport layer protocol type is UDP.

102: The NAT device receives a packet sent by a network device.

The source address of the packet is a private address of the network device and a destination address of the packet is the address of the controller.

When establishing a connection or communicating with the controller, the network device sends a packet to the controller by using the NAT device. The source address of the packet sent by the network device is the private address of the network device and the destination address is the address of the controller. The packet further includes a port number of the packet sent by the network device.

103: The NAT device performs NAT on the packet, where an after-NAT source address of the packet is a public address.

Because the controller is located in the public network, the NAT device, after receiving the packet sent by the network device, needs to perform NAT, to be specific, to translate the source address of the packet to the public address. After performing NAT on the packet, the NAT device sends the packet to the controller.

The NAT device may further translate a source port number of the packet sent by the network device.

104: On a basis that a static entry condition is met, the NAT device generates a target static NAT entry.

A static NAT entry is a NAT entry that does not age (or has a sufficient long aging time, for example, up to one week or one month). The target static NAT entry includes a correspondence between the private address of the network device, a before-NAT source port number of the packet, an after-NAT source port number of the packet, and the address of the controller. The before-NAT source port number of the packet indicates a port number included in the packet sent by the network device, that is, the port number used by the network device for communication with the controller. The static entry condition may include that the destination address of the packet is the address of the controller and that the NAT device has no static NAT entry that is corresponding to the private address of the network device and the before-NAT source port number. When the NAT device determines that the static entry condition is met, the NAT device generates the target static NAT entry. Generating the target static NAT entry by the NAT device includes establishing a static NAT entry or translating a dynamic NAT entry into a static NAT entry.

There may be one or more available public addresses after NAT. For example, when the NAT device performs NAT on all packets sent by the network device, one public address may be used. The packets use the same public address and different connections are distinguished by port numbers. In this case, because the packets use the same public address, the NAT entry may include no public address, and NAT is performed by using a default public address. When the NAT device uses a plurality of public addresses to perform address translation on packets, the NAT entry further needs to include the public addresses, and the target static NAT entry includes a correspondence between the private address of the network device, the before-NAT source port number of the packet, the public address, the after-NAT source port number of the packet, and the address of the controller.

There is no chronological order for performing step 103 and step 104 in this embodiment of the present invention.

In this embodiment of the present invention, the NAT device generates the target static NAT entry for the packet whose destination address is the address of the controller. In this way, a NAT entry corresponding to a persistent connection established between the network device and the controller is the static NAT entry. Even if duration in which the static NAT entry fails to be hit exceeds an aging time, the static NAT entry is not deleted. This avoids a problem that the network device and the controller cannot normally communicate with each other because the NAT entry is deleted due to long-time no communication between the network device and the controller.

In addition, in the prior art, to prevent a dynamic NAT entry between a network device and a controller from being deleted due to aging, the network device periodically sends a probe packet whose period is less than an aging period to the controller. In this embodiment of the present invention, the NAT device generates the target static NAT entry that is not deleted due to aging. Therefore, the network device does not need to periodically send a probe packet to the controller, thereby saving bandwidth between the NAT device and the controller, and avoiding a waste of resources.

After receiving the packet sent by the network device, the NAT device performs NAT on the packet and establishes the NAT entry. The NAT entry includes a correspondence between the private address of the network device, the before-NAT source port number of the packet, the after-NAT source port number of the packet, and the address of the controller. In this embodiment of the present invention, to prevent a NAT entry corresponding to the network device and the controller from being deleted due to aging, in the NAT device, a static NAT entry, to be specific, a target static NAT entry, is used to record an address translation relationship between the network device and the controller.

In this embodiment of the present invention, there is no chronological order for performing step 101 and step 102. Performing step 101 and step 102 in a different order indicates a different manner of generating the target static NAT entry by the NAT device.

When the NAT device performs step 101 earlier, the NAT device may first store the received connection parameter. At this time, the NAT device has no static NAT entry that records an address translation relationship between the network device and the controller. After receiving the packet sent by the network device to the controller, the NAT device finds that there is no corresponding dynamic or static NAT entry, and therefore a corresponding NAT entry needs to be established. In this case, the destination address of the packet is the address of the controller, indicating that the packet of the network device is sent to the controller. Therefore, the NAT device may directly establish the target static NAT entry and record the address translation relationship between the network device and the controller by using the target static NAT entry. Alternatively, the NAT device may first establish a dynamic NAT entry, where the dynamic NAT entry includes a correspondence between the private address of the network device, the before-NAT source port number of the packet, the after-NAT source port number of the packet, and the address of the controller, then determine, based on content of the dynamic NAT entry, whether the destination address of the packet sent by the network device is the address of the controller, and, after determining that the destination address of the packet sent by the network device is the address of the controller, translate the dynamic NAT entry into the static NAT entry.

If the NAT device receives the packet sent by the network device earlier, the NAT device at this time does not include the static NAT entry corresponding to the private address of the network device and the source port number of the packet. In this case, it can be determined whether the NAT device includes a dynamic NAT entry corresponding to the private address of the network device and the source port number of the packet. If the NAT device includes the dynamic NAT entry corresponding to the private address of the network device and the source port number of the packet, the NAT device may perform NAT on the packet based on the dynamic NAT entry. If the NAT device has no dynamic NAT entry corresponding to the private address of the network device and the source port number of the packet, the NAT device may perform NAT on the packet while establishing a dynamic NAT entry. The dynamic NAT entry includes a correspondence between the private address of the network device, the before-NAT source port number of the packet, the after-NAT source port number of the packet, and the address of the controller. Then, the NAT device receives the connection parameter. The NAT device searches dynamic NAT entries by using the connection parameter and finds the dynamic NAT entry that includes the connection parameter. The dynamic NAT entry includes the destination address of the packet sent by the network device, and the destination address is the address of the controller. The NAT device translates the dynamic NAT entry into the static NAT entry. Because the original dynamic NAT entry does not exist any longer after being translated into the static NAT entry, finding the dynamic NAT entry that includes the connection parameter indicates that no corresponding static NAT entry exists in the NAT device.

In this embodiment of the present invention, on the basis of step 104, when the connection parameter further includes the port number set, the static entry condition may further include that the destination port number of the packet sent by the network device belongs to the port number set. In this case, the target static NAT entry further includes a correspondence between the private address of the network device, the before-NAT source port number of the packet, the after-NAT source port number of the packet, the address of the controller, and the destination port number of the packet. When the connection parameter further includes the transport layer protocol type for establishing the connection between the controller and the network device, the static entry condition may further include that the transport layer protocol type of the connection establishment packet is the transport layer protocol type in the connection parameter, and the target static NAT entry further includes a correspondence between the private address of the network device, the before-NAT source port number of the packet, the after-NAT source port number of the packet, the address of the controller, and the transport layer protocol type. Alternatively, the connection parameter may include both the port number set and the transport layer protocol type for establishing the connection between the controller and the network device at the same time. In this case, the static entry condition may further include that the destination port number of the packet sent by the network device belongs to the port number set, and that the transport layer protocol type of the connection establishment packet is the transport layer protocol type in the connection parameter; and the target static NAT entry further includes a correspondence between the private address of the network device, the before-NAT source port number of the packet, the after-NAT source port number of the packet, the address of the controller, the destination port number of the packet, and the transport layer protocol type.

In an implementation of this embodiment of the present invention, the method in FIG. 2 may further include: receiving, by the NAT device, a first deletion instruction sent by the controller, where the first deletion instruction includes the connection parameter; then deleting, by the NAT device, the connection parameter and all target static NAT entries corresponding to the connection parameter.

The static NAT entry corresponding to the connection parameter indicates a static NAT entry that includes the connection parameter. For example, when the connection parameter includes the address of the controller, the static NAT entry corresponding to the connection parameter indicates a static NAT entry that includes the address of the controller. For another example, when the connection parameter includes the address of the controller and a port number, the static NAT entry corresponding to the connection parameter indicates a static NAT entry that includes the address of the controller and the port number. For another example, when the connection parameter includes the address of the controller and a protocol type, the static NAT entry corresponding to the connection parameter indicates a static NAT entry that includes the address of the controller and the protocol type. For another example, when the connection parameter includes the address of the controller, a port number, and a protocol type, the static NAT entry corresponding to the connection parameter indicates a static NAT entry that includes the address of the controller, the port number, and the protocol type.

In circumstances, for example, when the controller restarts, connections between the controller and the network devices all need to be re-established. Connection parameters for re-establishing the connections are most likely to change, and therefore correspondences in all static NAT entries corresponding to the connection parameters in the NAT device are likely to change. In this case, the controller may send the first deletion instruction to the NAT device to instruct the NAT device to delete the stored connection parameters and all the static NAT entries corresponding to the connection parameters, to be specific, static NAT entries corresponding to all persistent connections of the controller. In this way, the NAT device deletes, according to the first deletion instruction, a static NAT entry including a possibly changed correspondence, so as to avoid a packet forwarding error caused by NAT that is performed on the packet by the NAT device based on the static NAT entry including the possibly changed correspondence. In addition, the NAT device deletes the stored connection parameter and the target static NAT entries corresponding to the connection parameter. This can reduce a quantity of NAT entries stored in the NAT device and relieve workload in maintaining and managing the NAT entries.

In another implementation of this embodiment of the present invention, the method in FIG. 2 may further include: receiving, by the NAT device, a second deletion instruction, where the second deletion instruction includes the connection parameter and a target parameter, and the target parameter includes the public address of the network device, or the target parameter includes the public address of the network device and the after-NAT source port number; then deleting, by the NAT device, the connection parameter and a target static NAT entry corresponding to the connection parameter and the target parameter.

One or more connections may be established between the controller and the network device and the controller may instruct, based on a requirement, the NAT device to delete target static NAT entries corresponding to all persistent connections between the network device and the controller. For example, when all previous connections between the controller and a particular network device are disconnected, the controller sends a second deletion instruction with a target parameter that includes a public address of the network device, so as to instruct the NAT device to delete static NAT entries corresponding to all persistent connections between the controller and the particular network device. In this case, the target parameter may include the public address of the network device. Alternatively, the controller may delete only a target static NAT entry corresponding to a given connection between the network device and the controller. For example, when a previous particular connection between the controller and a particular network device is disconnected, the controller sends a second deletion instruction with a target parameter that includes a public address of the network device and an after-NAT source port number, so as to instruct the NAT device to delete a static NAT entry corresponding to a particular persistent connection between the controller and the particular network device. In this case, the target parameter includes the public address of the network device and the after-NAT source port number.

After the connection between the controller and the network device is disconnected, the corresponding target static NAT entry in the NAT device is not used any longer. The controller may send the second deletion instruction to the NAT device to instruct the NAT device to delete the connection parameter and a target static NAT entry corresponding to the connection parameter and the target parameter. In this way, no excessive NAT entries exist in the NAT device, thereby reducing a quantity of NAT entries, and relieving workload in maintaining and managing the NAT entries.

Figure 3:
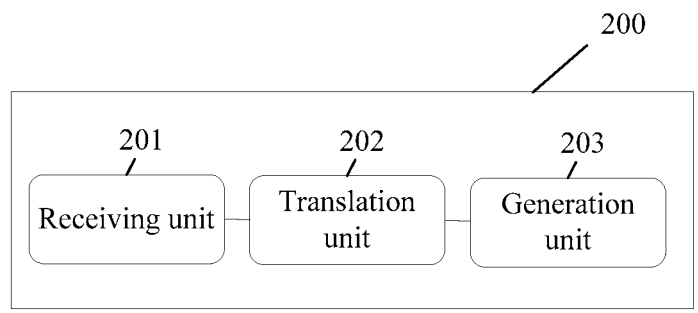
FIG. 3 is a schematic block diagram of a NAT entry management apparatus according to an embodiment of the present invention.

FIG. 3 is a schematic block diagram of a NAT entry management apparatus 200 according to an embodiment of the present invention. As shown in FIG. 3, the apparatus 200 includes:

a receiving unit 201, configured to receive and store a connection parameter, where the connection parameter includes an address of a controller; where the receiving unit 201 is further configured to receive a packet sent by a network device, where a source address of the packet is a private address of the network device and a destination address of the packet is the address of the controller;

a translation unit 202, configured to perform NAT on the packet, where an after-NAT source address of the packet is a public address; and a generation unit 203, configured to generate a target static NAT entry on a basis that a static entry condition is met, where the target static NAT entry includes a correspondence between the private address of the network device, a before-NAT source port number of the packet, an after-NAT source port number of the packet, and the address of the controller, and the static entry condition includes that the destination address of the packet is the address of the controller.

In this embodiment of the present invention, the apparatus 200 generates the target static NAT entry for the packet whose destination address is the address of the controller. In this way, a NAT entry corresponding to a persistent connection established between the network device and the controller is the static NAT entry. Even if duration in which the static NAT entry fails to be hit exceeds an aging time, the static NAT entry is not deleted. This avoids a problem that the network device and the controller cannot normally communicate with each other because the NAT entry is deleted due to long-time no communication between the network device and the controller.

It can be understood that the connection parameter may further include a port number set, and the port number set includes one or more port numbers of the controller that are open to the network device;

the static entry condition further includes that a destination port number of the packet belongs to the port number set; and the target static NAT entry further includes a correspondence between the private address of the network device, the before-NAT source port number of the packet, the after-NAT source port number of the packet, the address of the controller, and the destination port number of the packet.

The NAT entry management apparatus 200 according to this embodiment of the present invention may correspond to an execution body of the NAT entry management method according to the embodiments of the present invention, and the foregoing and other operations and/or functions of the modules of the NAT entry management apparatus 200 are intended to implement corresponding procedures of the method implemented by the NAT device in FIG. 2. For brevity, details are not described herein again.

Figure 4:
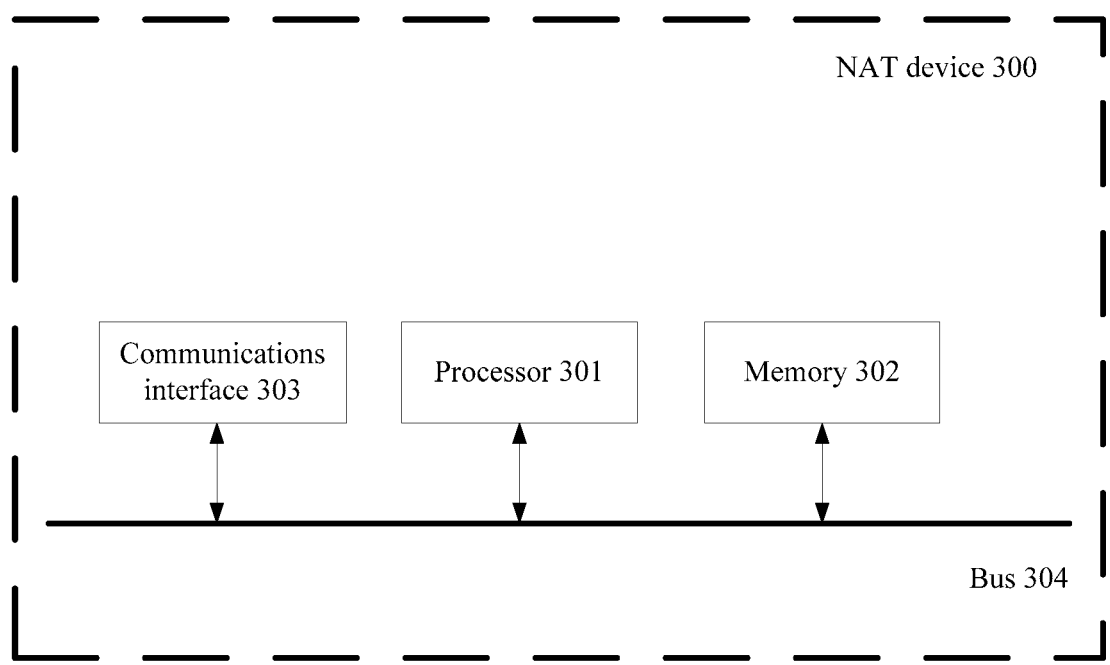
FIG. 4 is a schematic block diagram of a NAT device according to an embodiment of the present invention.

FIG. 4 is a schematic block diagram of a NAT device 300 according to an embodiment of the present invention. As shown in FIG. 4, the NAT device 300 includes a processor 301, a memory 302, and a communications interface 303 used for communication with an external device.

The processor 301 may include a dedicated NAT chip, a central processing unit (CPU), a network processor (NP), or any combination thereof. The dedicated NAT chip may be an application-specific integrated circuit (ASIC) or a programmable logic device (PLD). The PLD may be a complex programmable logic device (CPLD), a field programmable gate array (FPGA), a generic array logic (GAL), or any combination thereof. The circuits in the processor may be separate or integrated into one or more chips.

The memory 301 may be a separate component, or may be integrated into the processor 301. The processor 301 may include a volatile memory, such as a random access memory (RAM). The processor 301 may also include a non-volatile memory, such as a read-only memory (ROM), a flash memory, an optical disk, a magnetic tape, a floppy disk, a hard disk, or a solid state disk. Alternatively, the processor 301 may include any combination of the foregoing types of memories.

The communications interface 303 may be a wireless interface or a wired interface. The wireless interface may be a cellular mobile network interface, a wireless local area network interface, or the like. The wired interface may be an Ethernet interface, for example, an optical interface or an electrical interface.

The NAT device 300 may further include a bus 304, where the bus 304 is configured to connect the processor 301, the memory 302, and the communications interface 303, so that the processor 301, the memory 302, and the communications interface 303 communicate with each other by using the bus 304.

Specifically, the processor 301 may be configured to:

receive a connection parameter by using the communications interface 303 and store the connection parameter in the memory 302, where the connection parameter includes an address of a controller;

receive, by using the communications interface 303, a packet sent by a network device, where a source address of the packet is a private address of the network device and a destination address of the packet is the address of the controller;

perform NAT on the packet, where an after-NAT source address of the packet is a public address; and generate a target static NAT entry on a basis that a static entry condition is met, where the target static NAT entry includes a correspondence between the private address of the network device, the before-NAT source port number of the packet, the after-NAT source port number of the packet, and the address of the controller, and the static entry condition includes that the destination address of the packet is the address of the controller.

The NAT device 300 according to this embodiment of the present invention may correspond to an execution body of the NAT entry management method according to the embodiments of the present invention, and the foregoing and other operations and/or functions of the NAT device 300 are intended to implement corresponding procedures of the method in FIG. 2. For brevity, details are not described herein again.

All or some of the foregoing embodiments may be implemented by means of software, hardware, firmware, or any combination thereof When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, by using a coaxial cable, a twisted pair, or an optical fiber) or wireless (for example, by using infrared, radio, or microwave) manner. The computer-readable storage medium may be any usable medium accessible by a computer, or a data storage device integrating one or more usable media, for example, a server or a data center. The usable medium may be a magnetic medium (for example, a soft disk, a hard disk, or a magnetic tape), an optical medium (for example, an optical disc), a semiconductor medium (for example, a solid state disk SSD), or the like.

What is claimed is:

1. A network address translation (NAT) entry management method, comprising:
   receiving and storing, by a NAT device, a connection parameter, wherein the connection parameter comprises an address of a controller;
   receiving, by the NAT device, a packet sent by a network device, wherein a source address of the packet is a private address of the network device and a destination address of the packet is the address of the controller;
   performing, by the NAT device, NAT on the packet, wherein an after-NAT source address of the packet is a public address; and
   when a static entry condition is met, generating, by the NAT device, a target static NAT entry, wherein the target static NAT entry comprises a correspondence between the private address of the network device, a before-NAT source port number of the packet, an after-NAT source port number of the packet, and the address of the controller, and the static entry condition comprises that the destination address of the packet is the address of the controller.

2. The method according to claim 1, wherein the connection parameter further comprises a port number set, and the port number set comprises one or more port numbers of the controller that are open to the network device;
   the static entry condition further comprises that a destination port number of the packet belongs to the port number set; and
   the target static NAT entry further comprises a correspondence between the private address of the network device, the before-NAT source port number of the packet, the after-NAT source port number of the packet, the address of the controller, and the destination port number of the packet.

3. The method according to claim 1, further comprising:
   receiving, by the NAT device, a first deletion instruction sent by the controller, wherein the first deletion instruction comprises the connection parameter; and
   deleting, by the NAT device, the connection parameter and all static NAT entries corresponding to the connection parameter.

4. The method according to claim 1, further comprising:
   receiving, by the NAT device, a second deletion instruction sent by the controller, wherein the second deletion instruction comprises the connection parameter and a target parameter, and the target parameter comprises the public address of the network device, or the target parameter comprises the public address of the network device and the after-NAT source port number; and
   deleting, by the NAT device, the connection parameter and the target static NAT entry corresponding to the connection parameter and the target parameter.

5. A network address translation (NAT) device, comprising a memory, a processor, and a communications interface, wherein:
   the processor is configured to:
   receive a connection parameter by using the communications interface and store the connection parameter in the memory, wherein the connection parameter comprises an address of a controller;
   receive, by using the communications interface, a packet sent by a network device, wherein a source address of the packet is a private address of the network device and a destination address of the packet is the address of the controller;
   perform NAT on the packet, wherein an after-NAT source address of the packet is a public address; and
   generate a target static NAT entry when a static entry condition is met, wherein the target static NAT entry comprises a correspondence between the private address of the network device, a before-NAT source port number of the packet, an after-NAT source port number of the packet, and the address of the controller, and the static entry condition comprises that the destination address of the packet is the address of the controller.

6. The NAT device according to claim 5, wherein the connection parameter further comprises a port number set, and the port number set comprises one or more port numbers of the controller that are open to the network device;
   the static entry condition further comprises that a destination port number of the packet belongs to the port number set; and
   the target static NAT entry further comprises a correspondence between the private address of the network device, the before-NAT source port number of the packet, the after-NAT source port number of the packet, the address of the controller, and the destination port number of the packet.

7. The NAT device according to claim 5, wherein the processor is further configured to:
   receive, by using the communications interface, a first deletion instruction sent by the controller, wherein the first deletion instruction comprises the connection parameter; and
   delete the connection parameter and all static NAT entries corresponding to the connection parameter.

8. The NAT device according to claim 5, wherein the processor is further configured to:
   receive, by using the communications interface, a second deletion instruction sent by the controller, wherein the second deletion instruction comprises the connection parameter and a target parameter, and the target parameter comprises the public address of the network device, or the target parameter comprises the public address of the network device and the after-NAT source port number; and
   delete the connection parameter and the target static NAT entry corresponding to the connection parameter and the target parameter.

9. A non-transitory computer-readable storage medium, wherein the computer-readable storage medium stores an instruction, and when the instruction runs on a computer, the computer is enabled to execute the method according to claim 1.

* * * * *